US008743813B2

(12) United States Patent
Liu et al.

(10) Patent No.: US 8,743,813 B2
(45) Date of Patent: Jun. 3, 2014

(54) METHOD FOR TRANSMITTING REFERENCE SIGNALS

(75) Inventors: Jianghua Liu, Beijing (CN); Branislav Popovic, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 13/434,525

(22) Filed: Mar. 29, 2012

(65) Prior Publication Data
US 2012/0182956 A1 Jul. 19, 2012

Related U.S. Application Data

(63) Continuation of application No. 13/194,654, filed on Jul. 29, 2011, which is a continuation of application No. PCT/CN2009/070329, filed on Feb. 1, 2009.

(51) Int. Cl.
*H04W 4/00* (2009.01)
*H04L 5/00* (2006.01)
*H04L 27/26* (2006.01)
*H04W 72/04* (2009.01)

(52) U.S. Cl.
CPC ............ *H04L 5/0053* (2013.01); *H04L 27/261* (2013.01); *H04W 72/04* (2013.01); *H04L 27/2613* (2013.01)
USPC .......... 370/329; 370/330; 370/252; 455/13.3; 455/450

(58) Field of Classification Search
None
See application file for complete search history.

(56) References Cited

U.S. PATENT DOCUMENTS

2008/0232494 A1   9/2008  Pan et al.
2008/0318567 A1  12/2008  Popovic et al.
2010/0104034 A1*  4/2010  Nam et al. .................... 375/260

FOREIGN PATENT DOCUMENTS

CN   101340227 A   1/2009
CN   101355412 A   1/2009

OTHER PUBLICATIONS

Extended European Search Report issued in corresponding European Patent Application No. 09839057.8, mailed May 8, 2012.
Motorola, "Common Reference Symbol Mapping/Signaling for 8 Transmit Antennas" Agenda Item 11.3, 3GPP TSG RAN1 #55. Prague, Czech Republic, Nov. 10-14, 2008. R1-084408.
Texas Instruments, "Common Reference Symbol Mapping/Signaling for 8 Transmit Antenna" Agenda Item 12.5, 3GPP TSG RAN WG1 #55 bis. Ljubljana, Slovenia, Jan. 12-16, 2009. R1-090288.
International Search Report issued in corresponding PCT Patent Application No. PCT/CN2009/070329, mailed Nov. 5, 2009.
Written Opinion of the International Searching Authority issued in corresponding PCT Patent Application No. PCT/CN2009/070329, mailed Nov. 5, 2009.

(Continued)

*Primary Examiner* — Ian N. Moore
*Assistant Examiner* — Jackie Zuniga Abad
(74) *Attorney, Agent, or Firm* — Brinks Gilson & Lione

(57) ABSTRACT

A method and apparatus for transmitting reference signals in a wireless communication system is disclosed. The method and apparatus includes reference signal, RS, transmission in resource blocks supporting multiple antenna port transmission, at least one broadcast channel being provided in resource blocks belonging to a first set of resource blocks, a first number of reference signals being transmitted in at least one resource block supporting multiple antenna port transmission and a second number of reference signals being transmitted in at least one resource block belonging to a second set of resource blocks. Preferably, different resource elements, REs, are used for each reference signal in resource blocks. An example embodiment of reference signal support of, e.g., eight antenna ports is provided.

20 Claims, 14 Drawing Sheets

(56) References Cited

OTHER PUBLICATIONS

Motorola, "Common Reference Symbol Mapping/Signaling for 8 Transmit Antennas". 3GPP TSG RAN1 #54, Jeju, Korea, Aug. 18-22, 2008. R1-083224.

Texas Instruments, "Common Reference Symbol Mapping/Signaling for 8 Transmit Antenna". 3GPP TSG RAN1 #54bis, Prague. Czech Republic, Sep. 29-Oct. 3, 2008. R1-083532.

3rd Generation Partnership Project, Technical Specification Group Radio Access Network; "Evolved Universial Terrestrial Radio Access (E-UTRA); Physical Channels and Modulation" (Release 8). 3GPP TS 36.211, v8.5.0, Dec. 2008.

3rd Generation Partnership Project, Technical Specification Group Radio Access Network; "Evolved Universial Terrestrial Radio Access (E-UTRA); Physical Channels and Modulation" (Release 8). 3GPP TS 36.211, V8.4.0, Sep. 2008.

3rd Generation Partnership Project, Technical Specification Group Radio Access Network; "Evolved Universal Terrestrial Radio Access (E-UTRA); Physical Channels and Modulation" (Release 8). 3GPP TS 36.211, V8.5.0, Dec. 2008.

3rd Generation Partnership Project, Technical Specification Group Radio Access Network; "Evolved Universal Terrestrial Radio Access (E-UTRA); Physical Channels and Modulation" (Release 8). 3GPP TS 36.211, V8.4.0, Sep. 2008.

3rd Generation Partnership Project, "Technical Specification Group Radio Access Network; Requirements for Further Advancements for E-UTRA (LTE-Advanced)" (Release X) 3GPP TR 36.913, V0.0.4. May 2005.

Office Action issued in corresponding Korean Patent Application No. 10-2011-7019399, mailed Aug. 23, 2012.

Office Action issued in commonly owned U.S. Appl. No. 13/194,654, mailed Dec. 5, 2012.

Office Action issued in corresponding Chinese Patent Application No. 200980155022.2, mailed Dec. 31, 2012.

Nortel, "Design Aspect for Higher-order MIMO in LTE-advanced" Agenda Item 12.2, 3GPP TSG-RAN Working Group 1 Meeting #55b. Ljubljana, Slovenia, Jan. 12-16, 2009. R1-090144.

Office Action issued in corresponding European Patent Application No. 09839057.8, mailed Apr. 16, 2013.

Office Action issued in corresponding Australian Patent Application No. 2009338660, mailed Mar. 8, 2013.

\* cited by examiner

METHOD FOR TRANSMITTING REFERENCE SIGNALS

CROSS-REFERENCE TO RELATED APPLICATIONS

This application is a continuation of U.S. patent application Ser. No. 13/194,654, filed on Jul. 29, 2011, which is a continuation of International Application No. PCT/CN2009/070329, filed on Feb. 1, 2009, both of which are hereby incorporated by reference in their entireties.

TECHNICAL FIELD

The present disclosure relates to a method for transmitting reference signals in a wireless communication system. Furthermore, a method in a transmit node, a method in a receive node, a transmit node apparatus and a receive node apparatus relating to the method above are disclosed.

BACKGROUND

In wireless communication system, one or a multiple of common Downlink (DL) Reference Signals (RSs) may be used for coherent demodulation and channel measurement for each mobile terminal (also called a User Equipment (UE) in some systems) in a given cell. In case of multi-antenna transmission, an antenna is identified by a RS transmitted on that antenna. Each RS defines a so-called antenna port at a transmitter in a given cell. If multiple antennas use the same RS, they will belong to the same antenna port. RSs of different antenna ports should be orthogonal to each other in order to allow interference-free identification of each corresponding propagation channel coefficients at a receiver. The RSs are usually cell-specific to minimize interference between RSs belonging to different cells in a wireless communication system. The RSs are transmitted on exclusively reserved resources of a cell, such as on time and frequency Resource Elements (REs), codes, etc. To avoid interference, data is not transmitted on reserved resources allocated for RSs.

RSs are used for measurement of the radio channel and demodulation. For instance, a UE can determine Channel Quality Indicator (CQI), Precoding Matrix Indicator (PMI) and Rank Indicator (RI) by measuring received RSs, and feedback measurement results including CQI/PMI/RI to a base station (such as a Node B or a eNB) for scheduling; or the UE can estimate the channel using the RSs, and use the estimated channel to demodulate data. The RSs used for measurement are usually common to all UEs in a cell, and cell-specific; the RSs used for demodulation can be common to all UEs or dedicated for a specific UE, and hence RSs used for demodulation can be cell-specific or UE-specific. RSs that are common to all UEs in a cell will be denoted Common RSs (CRSs).

In the Long Term Evolution (LTE) standard, measurement RSs and demodulation RSs share the same RSs, i.e. the same RSs are used for both measurement and demodulation, and are common to all UEs in cell-specific manner. In wireless communication systems with scheduling functionality, a base station first needs to know radio channel information for each UE, and then schedule the UEs based on the radio channel information. In order to obtain the radio channel information for each UE, the base station must transmit CRSs for all the UEs to measure the channel. Therefore CRSs are necessary in cellular wireless communication systems of this kind.

In the LTE standard, three types of cell-specific RSs are supported; defining one, two and four antenna ports (3GPP TS 36.211 v8.5.0). FIG. 1 illustrates how REs are used for transmission of RSs on each antenna port. It can be observed that resources for RSs of different antenna ports are orthogonal to each other through using different RE for each RS in Resource Blocks (RBs). Here a RB is defined as Nsymb consecutive OFDM symbols in the time domain and Nsc consecutive subcarriers in the frequency domain, but generally relates to radio resources in the frequency/time domain.

In order to be able to use CRSs properly in the DL, the key information which a UE needs is how many antenna ports that are used for DL transmission and the position of the RS on each antenna port. In the LTE standard, information about the number of antenna ports is embedded in a signal transmitted on a Physical Broadcast Channel (PBCH), and the position of the RS on each antenna port is associated with cell Identity (ID), which is conveyed in the Primary/Secondary Synchronization Signal (P/S-SS).

After successful cell search procedure, the UE will obtain time and frequency synchronization with a specific cell, as well as the cell ID for that cell. Based on the cell ID, the UE will know the RS on each antenna port in that cell. However, the UE will still not have information about the exact number of used antenna ports. Since this information is embedded in the PBCH signal, the UE has to make blind detection of that information, which means that it has to check all possible variants of the information and select the variant that is most probable conditioned on the received PBCH signal. The transmission structure for PBCH and P/S-SS according to the LTE standard is illustrated in FIG. 2 (note that the RSs are not shown in FIG. 2).

The first T OFDM symbols in each Sub-Frame (SF) are used for transmission of control information, such as Physical Downlink Control Channel (PDCCH), Physical Control Format Indicator Channel (PCFICH) and Physical Hybrid ARQ Indicator Channel (PHICH), where T=1, 2, 3, or 4. The area containing control information in a slot is called a control region, and the remaining resources in each slot belong to a non-control region. In the non-control region, all REs, except for the ones used for PBCH, P/S-SS and RSs, belong to the Physical Downlink Shared Channel (PDSCH) region.

In FIG. 2, P-SS and S-SS are transmitted on the last two OFDM symbols of slot0 (S0) and slot10 (S10), respectively, and are located at the central frequency part (centre six RBs) of the system bandwidth, while PBCH is transmitted in the central six RBs of slot1 (S1). In the RBs for transmission of PBCH information, data is mapped to time-frequency resources on the first four OFDM symbols as if maximum number of antenna ports is used (i.e. four in the LTE standard), i.e. as if all possible RSs in a cell are transmitted. In other words, the REs for all RSs in the first four OFDM symbols are reserved in a cell even if not all RSs are actually transmitted. An example is given in FIG. 3 for the illustration of PBCH resources corresponding to different number of antenna ports. For convenience, in the example, only the PBCH resources in one of the RBs used by the PBCH are shown.

In this way, the used resources for PBCH transmission are constant and independent of the number of used antenna ports, allowing for a single PBCH modulation and coding scheme, and consequently stable PBCH channel quality is independent of the number of used antenna ports. This is a key feature of PBCH channel that allows for blind detection of the embedded information relating to actually used antenna ports. That is, the information about the antenna port configuration is embedded into the PBCH by employing different Cyclic Redundancy Check (CRC) masks to indicate the number of antenna ports used.

In embedding the number of antenna ports used by a transmitter into PBCH, firstly, the entire PBCH transport block $a_0$, $a_1, \ldots, a_{A-1}$ is used to calculate the CRC parity bits $p_0, p_1, \ldots, p_{L-1}$, where A is the size of the transport block, i.e. the number of information bits, and L is the number of CRC parity bits which is set to 16 in the LTE standard. Secondly, according to the antenna port configuration of a specific cell, the CRC parity bits are scrambled by a sequence $x_0''$, $x_1''$, ... $x_{15}''$ with length 16 corresponding to a certain number of antenna ports n, where n=1, 2 or 4. After scrambling, the masked CRC parity bits are $c_0, c_1, \ldots c_{15}$, where $c_i = (p_i + x_i'')$ mod 2, i=0, 1, ..., 15. Then, the masked CRC parity bits are attached to the transport block of PBCH to obtain the information bits as $a_0, a_1, \ldots a_{A-1}, c_0, c_1, \ldots, c_{15}$. The mapping relation between the three scrambling sequences and the number of antenna ports is shown in Table 1.

TABLE 1

CRC mask for PBCH in LTE

| Number of antenna ports | CRC mask sequence |
|---|---|
| 1 | <0, 0, 0, 0, 0, 0, 0, 0, 0, 0, 0, 0, 0, 0, 0, 0> |
| 2 | <1, 1, 1, 1, 1, 1, 1, 1, 1, 1, 1, 1, 1, 1, 1, 1> |
| 4 | <0, 1, 0, 1, 0, 1, 0, 1, 0, 1, 0, 1, 0, 1, 0, 1> |

Finally, a set of operations including channel coding, rate matching, modulation and resources mapping are performed on the information bits. If there is only one antenna port used, the modulation symbols are directly mapped to the reserved resources on antenna port 0; in the case of two antenna ports used, Space Frequency Block Coding (SFBC) is performed on the modulation symbols, and then the output of SFBC is mapped to the reserved resources on antenna port 0 and 1, respectively; and in the case of four antenna ports used, SFBC and Frequency Switching Transmit Diversity (FSTD) is performed on the modulation symbols, and then the output of SFBC+FSTD is mapped to the reserved resources on antenna port 0, 1, 2 and 3, respectively.

At the receiver side, corresponding inverse operations including resource de-mapping, decoding (SFBC or SFBC+FSTD), demodulation, channel decoding, CRC mask removal and CRC detection are performed by e.g. a UE accessing a cell. During the detection of PBCH, there are three hypothesises (one, two or four antenna ports) to be blindly detected by the receiver. Given one hypothesis, if the final CRC detection is correct, then the PBCH information bits and the information about the number of antenna ports will be obtained.

The LTE-Advanced (LTE-A) system is a wireless communication system intended to be an extension of the LTE system in which eight antenna ports defined by RSs may be supported to further increase system performance such as: peak data rate, cell average spectrum efficiency, etc (3GPP TR 36.913 0.1.1). However, in order to fulfill LTE-A backward compatibility requirements, it should be possible for a system to serve both LTE UEs and LTE-A UEs in a LTE-A cell, comprising up to eight RSs defining the same number of DL antenna ports, where LTE UEs are UEs configured according to the LTE system functionality and LTE-A UEs are UEs configured according to the LTE-A system functionality.

SUMMARY

An object of an embodiment of the disclosure is to support transmission of reference signals in resource blocks carrying more than one reference signal.

Also, an object of an embodiment of the disclosure is to support transmission of reference signals in resource blocks carrying one or more control channels.

In an aspect of the disclosure, broadcast channel requirements remain unaffected of transmission of added reference signals.

According to a preferred method of transmitting reference signals in a wireless communication system, e.g. UEs of LTE systems can be served in a developed LTE-A wireless communication system operating in accordance with the disclosure.

In an example system according to the disclosure, channel measurement performance for UEs supporting an additional numbers of antenna ports, such as LTE-A UEs, will not be impacted.

The disclosure provides a method and system of transmission of reference signals in disjoint sets of resource blocks as described in detail below.

BRIEF DESCRIPTION OF THE DRAWINGS

The appended drawings are intended to clarify and explain the present disclosure where.

DETAILED DESCRIPTION

As discussed, the LTE-A system is supposed to be an extension of the LTE system where up to eight antenna ports will be supported to further increase system performance. Since an antenna port is defined by a RS, the RSs for more than four antenna ports should be designed in LTE-A. In LTE, four antenna ports are already defined, and in order to enable LTE UEs to work in LTE-A system, i.e. backward compatibility, the four antenna ports as defined in LTE should be reused in the LTE-A system. Hence, one problem is the design of the RSs for the additional four antenna ports.

Figure 6:
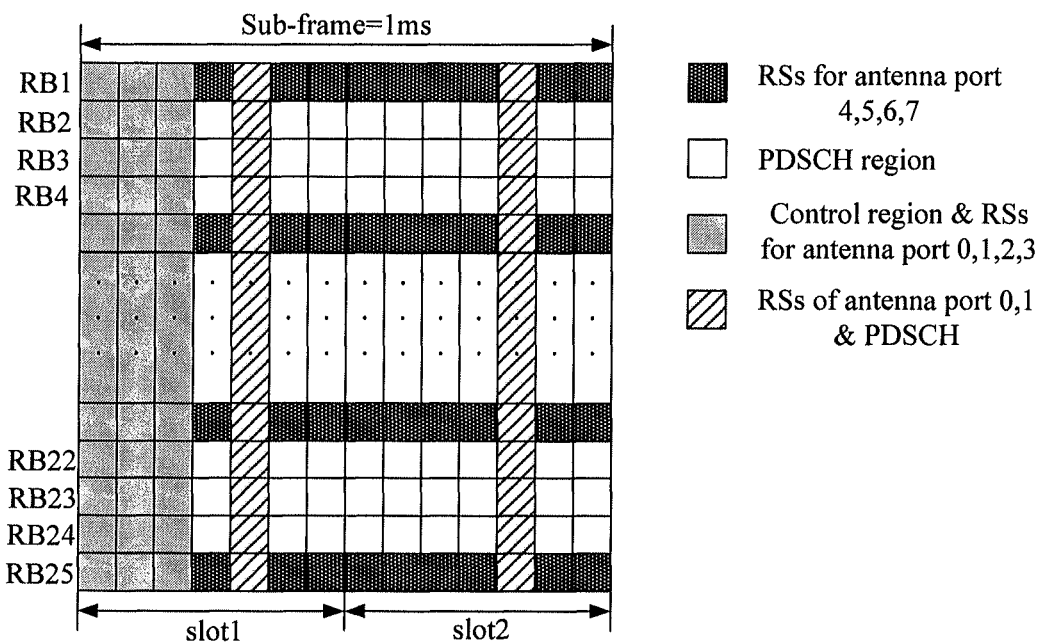
FIG. 6 shows mapping of RSs for four additional antenna ports on reserved PRBs in a solution according to prior art.

According to a first proposed prior art solution, RSs for the additional four antenna ports are transmitted on the third OFDM symbol of every slot; according to a second proposed prior art solution, RSs for the additional four antenna ports are transmitted on the third and the fourth OFDM symbol of every slot; and according to a third proposed prior art solution, RSs for the additional four antenna ports are transmitted in some reserved Physical RBs (PRBs) in a given sub-frame (SF), which is illustrated in FIG. 6.

It has been observed that in the methods according to the first, second and third proposed prior art solution above, some REs allocated for the PBCH will be punctured, since these REs are allocated for additional four antenna ports (RSs), and the performance for the PBCH will therefore be degraded in terms of detection performance. In order to preserve the detection performance for PBCH and also for P/S-SS, the REs for these signals/channels should not be used for other purposes, i.e. the PBCH and P/S-SS information should not be punctured arbitrarily as correct detection of PBCH and P/S-SS is very important for obtaining RS information for one cell; otherwise the UE will not be able to correctly communicate with a base station for that cell.

Figure 1:
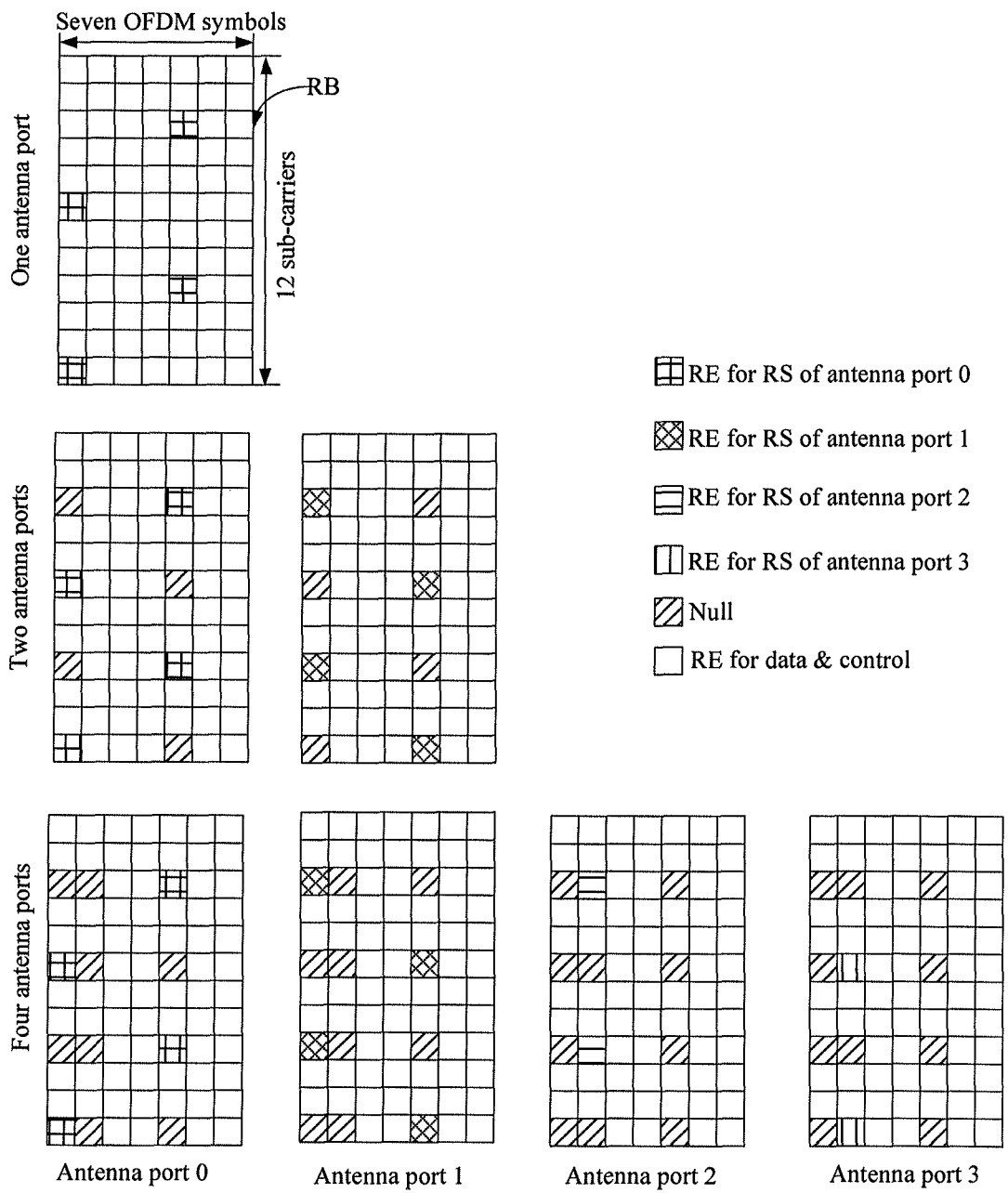
FIG. 1 shows the mapping of DL RSs defined according to the LTE standard.
Figure 2:
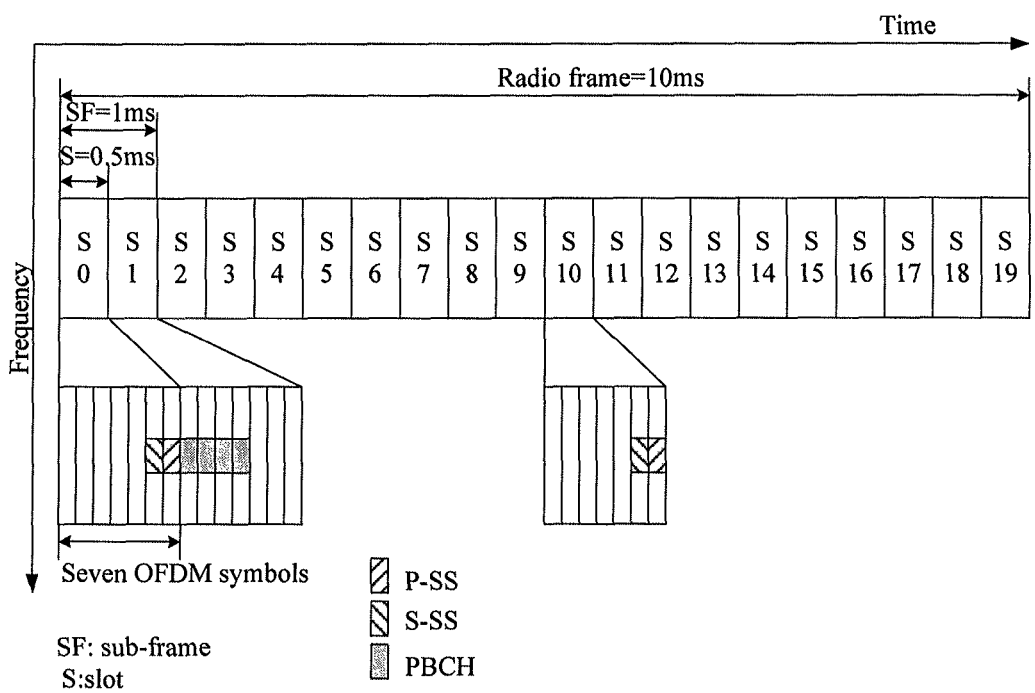
FIG. 2 shows the transmission structures for PBCH and P/S-SS in LTE.
Figure 3:
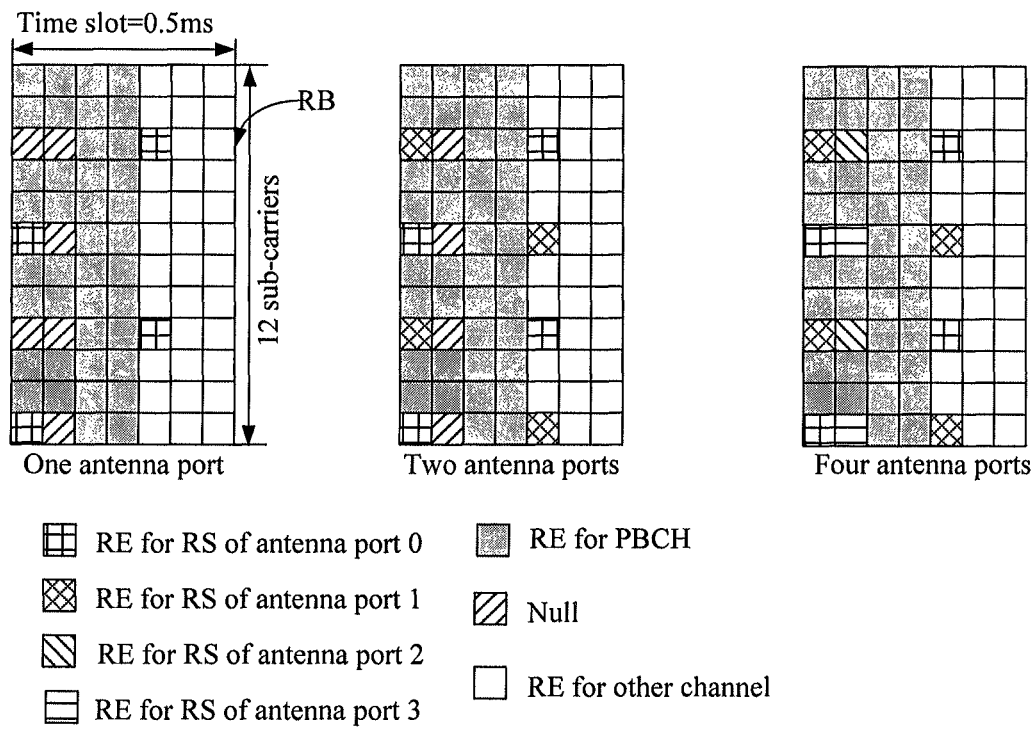
FIG. 3 shows PBCH resources in relation to resource for different number of antenna ports.
Figure 4:
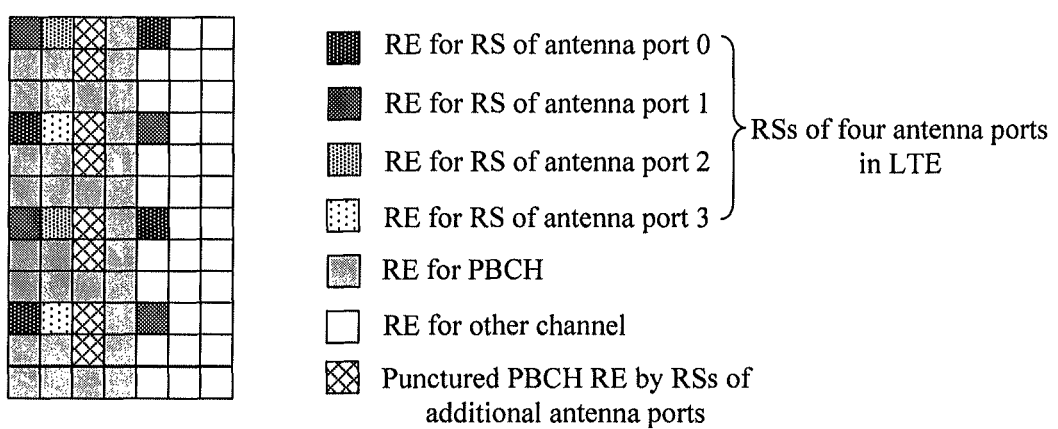
FIG. 4 shows how PBCH REs are punctured by RSs for additional antenna ports in a solution according to prior art.
Figure 5:
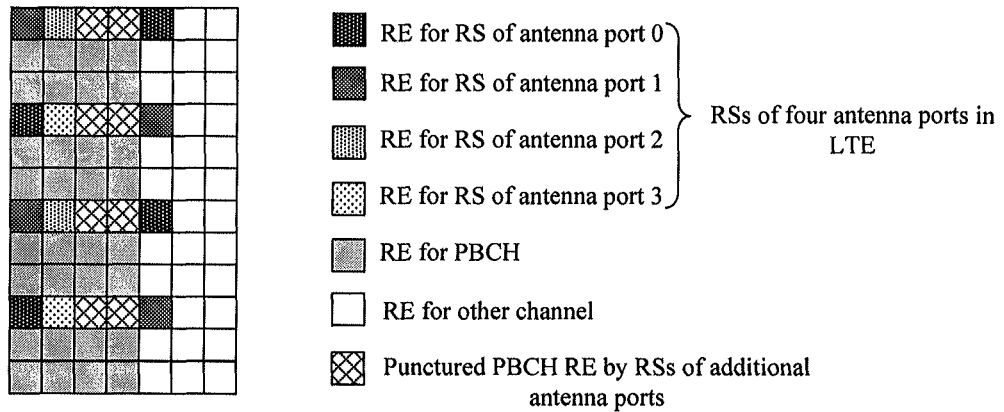
FIG. 5 shows how PBCH REs are punctured by RSs for additional antenna ports in a solution according to prior art.

In the first prior art solution above, in slot 1, some of the REs allocated for the PBCH will be punctured since these REs are allocated for the additional four antenna ports, which is illustrated in FIG. 4; in the second prior art solution above, some of the REs allocated for the PBCH will be punctured since these REs are allocated for the additional four antenna ports, which is shown in FIG. 5; and in the third prior art solution above, if the reserved PRBs overlap with the PRBs in which the PBCH is transmitted, all the REs allocated for the PBCH will be punctured by the RSs for the additional four antenna ports, and performance will substantially be degraded.

According to a fourth proposed prior art solution, RSs for the additional four antenna ports are only located in the PDSCH region. In RBs, in which the PBCH is transmitted in, the remaining REs except for ones allocated for the PBCH and RSs all belong to the PDSCH region. If the RSs for the additional four antenna ports are located in the PDSCH region within the above mentioned RBs, LTE-A UEs would identify eight antenna ports, including the four antenna ports defined in the LTE standard, and the additional four antenna ports proposed for the LTE-A system. However, LTE UEs can only identify the RSs for the four LTE antenna ports and need to receive the PBCH using the four identified antenna ports. In order to avoid power imbalance between different antenna ports, not only the first four antenna ports (for LTE) can be used. To uphold power balance, virtual antenna port mapping is needed for the four LTE antenna ports, but with virtual antenna mapping LTE-A UEs will not accurately identify the first four antenna ports as defined in the LTE standard.

Figure 7:
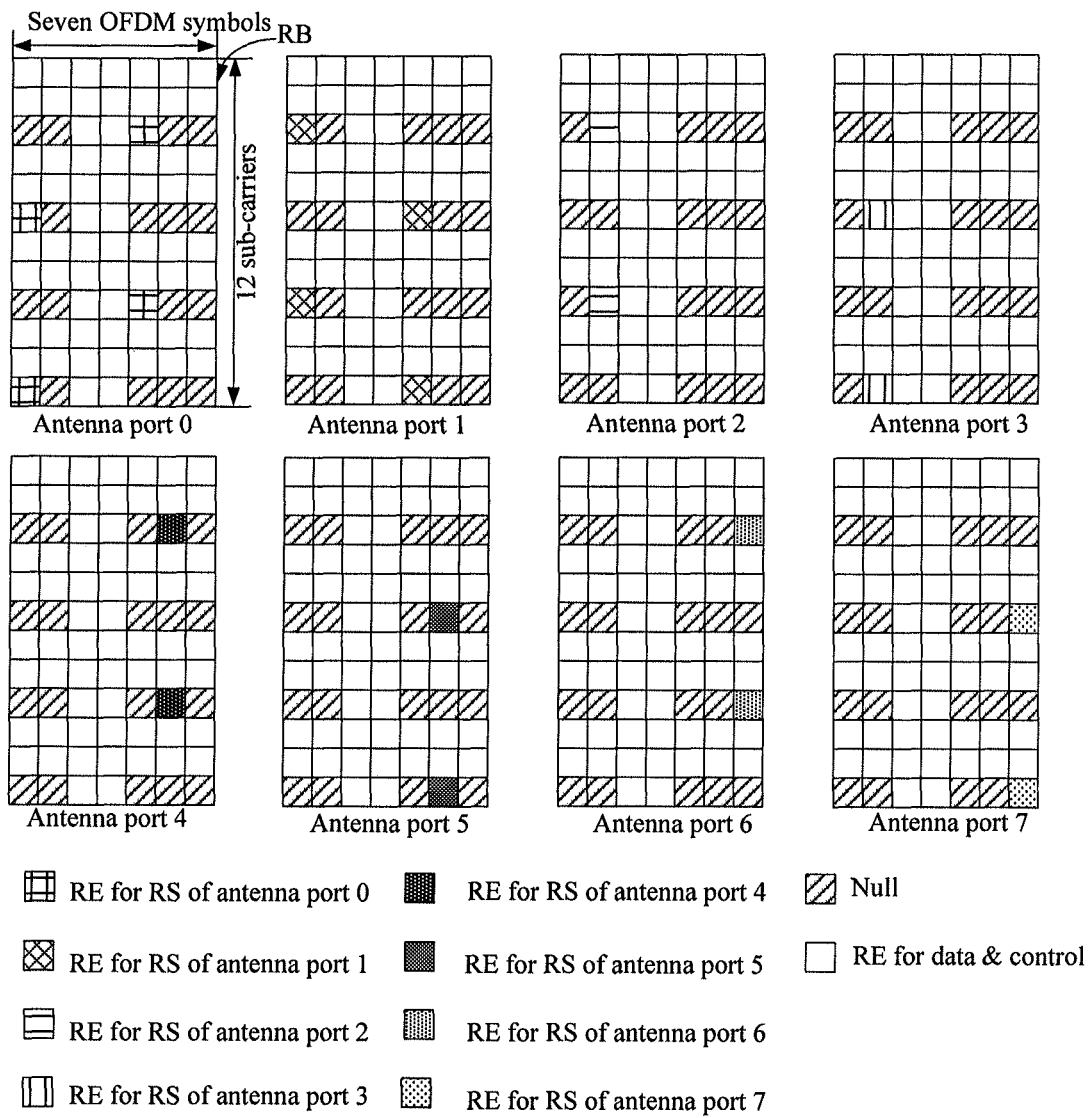
FIG. 7 shows CRSs for eight antenna ports for LTE-A UEs.

In the LTE-A system, LTE-A UEs needs to measure the channel (e.g. CQI, PMI and RI) by using CRSs for eight antenna ports, which is shown in FIG. 7. Based on the CRSs for the eight antenna ports, the LTE-A UE can measure the channel for each antenna port, and use the estimated channel for each antenna port to e.g. calculate CQI, and select PMI and RI. The operation of LTE-A UE measurement is similar to the operation performed by LTE UE, and the only difference is the number of measured antenna ports.

Figure 8:
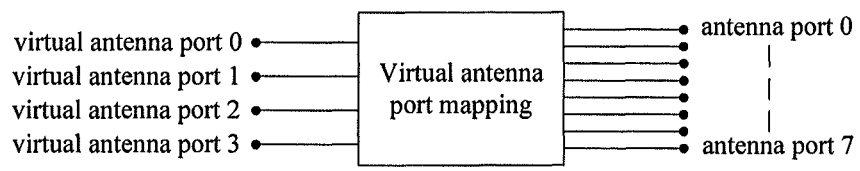
FIG. 8 shows the relation between virtual antenna ports and antenna ports.
Figure 9:
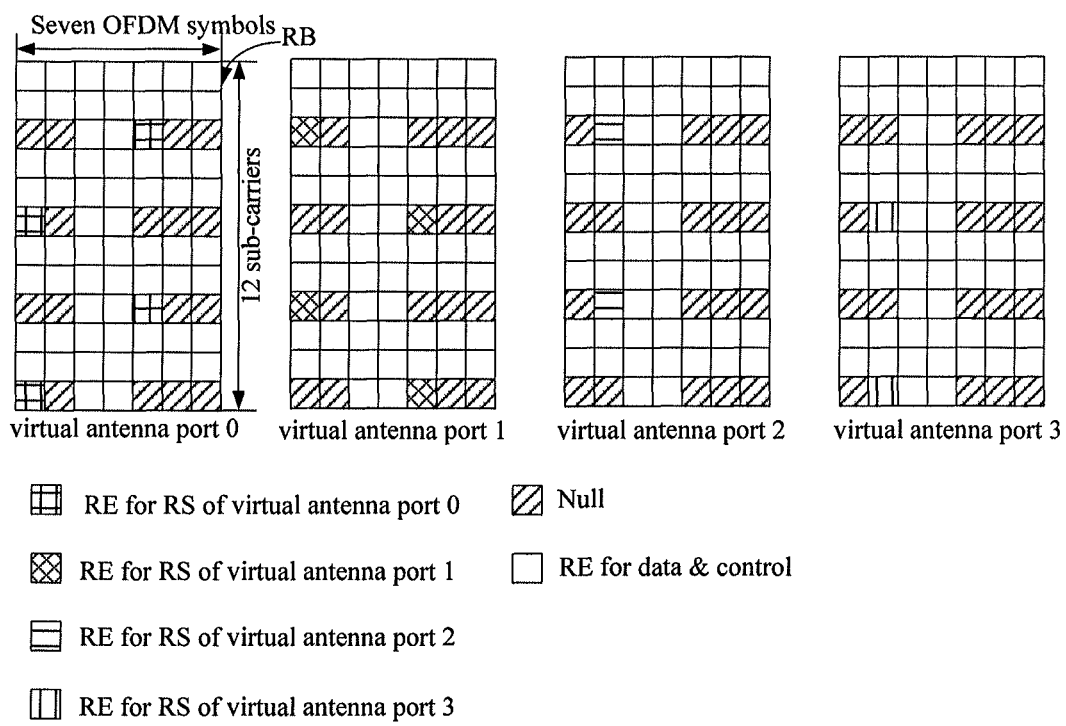
FIG. 9 shows four virtual antenna ports.
Figure 10:
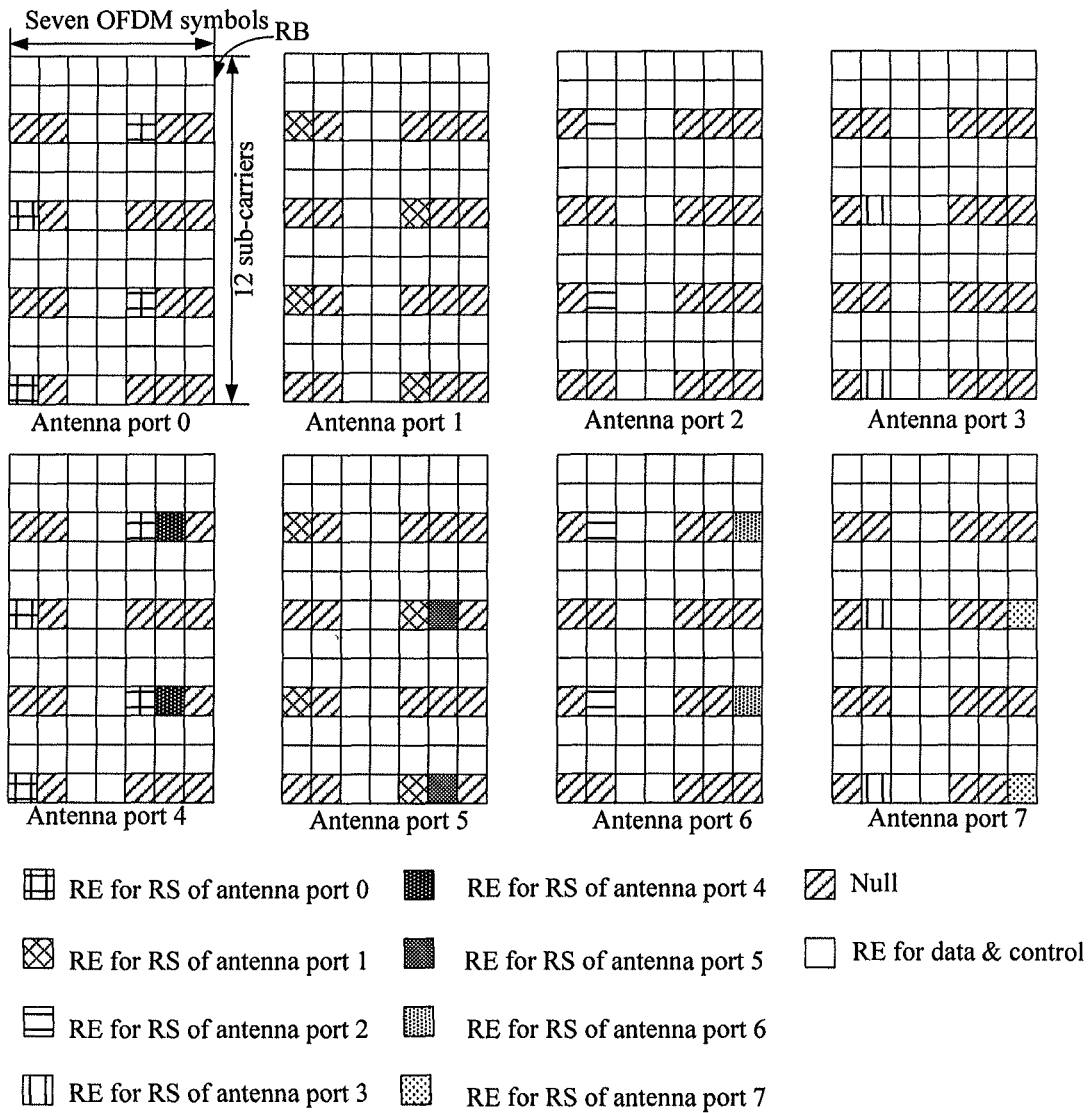
FIG. 10 shows CRSs for eight antenna ports after virtual antenna port mapping.

If there is data for a LTE UE transmitted on a RB having CRSs defining eight antenna ports as shown in FIG. 7, the LTE UE can only identify and use the four antenna ports defined in the LTE standard to demodulate the data. A straight forward solution could be to only use antenna ports 0~3 and refraining from transmitting on the remaining antenna ports 4~7, which can be seen as antenna selection. A major drawback with this solution is the power imbalance between the different antenna ports, which is very undesirable in power amplifiers. Given that the total transmission power for all the eight antenna ports is constant, if antenna ports 4~7 are not used, then the transmission power for antenna ports 0~3 will be doubled. As the dynamic range of a power amplifier is the same among the eight antenna ports, with double transmission power the dynamic range of the power amplifier will easily be exceeded. If transmission power exceeds the dynamic range of the power amplifier, interference will be introduced to adjacent channels. To avoid power imbalance between different antenna ports, the data may be transmitted on four virtual antenna ports which are mapped onto all eight antenna ports through virtual antenna mapping as shown in FIG. 8. The RSs for four virtual antenna ports are the same as the four antenna ports defined in the LTE standard. The four virtual antenna ports identified by a LTE UE, and the CRSs for eight antenna ports after virtual antenna port mapping identified by LTE-A UE is illustrated in FIG. 9 and FIG. 10, respectively.

It can be observed that the provided virtual antenna ports are the same as the four antenna ports defined in LTE, i.e. the RSs for the virtual antenna ports are the same as the four antenna ports defined in LTE. Actually, one virtual antenna port is the combination of two antenna ports in this example, e.g. virtual antenna port 0 is obtained by adding antenna port 0 and antenna port 4, and so on. The shown mapping is only an example, and a virtual antenna port may be a combination of different antenna ports, which depends on the virtual antenna mapping function of which one example is shown in FIG. 8.

With virtual antenna mapping LTE UEs can work as usual, but LTE-A UEs can only accurately measure the channel for antenna ports 4~7 by using the RSs for antenna ports 4~7, respectively. When a LTE-A UE measures the channel for antenna ports 0~3 by using the RSs for said ports 0~3, the estimated channel is actually the estimated channel for a combination of two antenna ports channels, and consequently the LTE-A UE cannot accurately measure the channel for antenna ports 0~3. Therefore, the CRSs for additional antenna ports cannot be transmitted in RBs, in which a physical channel that LTE UEs need to detect for proper operation, is transmitted in.

Before accessing a given cell, a UE has to firstly detect the PBCH for this particular cell after successful cell search procedure. The allocated resources for the physical channel are predefined regardless of the cell-specific information. In LTE, the mapping resources for PBCH are defined, and LTE UEs receive the physical channel according to the current definition. When the LTE UE access a LTE-A communication system, the LTE UE will still assume that it operates in a LTE system. For the LTE UE to work properly in this system, the PBCH in a LTE-A cell must be detected by the LTE UE. Thus, the mapping resources for the PBCH in the LTE system should be reused, or otherwise LTE UEs cannot successfully access the LTE-A communication system. Therefore, any new features in a LTE-A system should not impact on the mapping resources of the PBCH according to the LTE system.

In the LTE-A system, the PBCH for LTE should be reused. Since PBCH conveys system information for assisting communication both LTE UEs and LTE-A UEs will detect the same PBCH. In order to fulfill the requirement of backward compatibility, and to preserve performance for PBCH (i.e. to avoid puncturing of PBCH by CRSs for additional four antenna ports), and not to impact on measurement performance for LTE-A UEs as mentioned above; the CRSs for additional antenna ports should not be transmitted in the RBs in which a broadcast channel, such as PBCH, is transmitted in. Therefore, the CRS for the first four antenna ports 0~3 should reuse the current RS structure for first four antenna ports (i.e. antenna ports 0~3) as defined in the LTE standard, and the CRSs for additional second antenna ports (antenna ports 4~7) should not be transmitted in RBs in which a broadcast channel is transmitted in.

Therefore, a method for transmitting RSs in RBs in a wireless communication system according to the present disclosure is proposed. RBs are numbered from 0 to NRB−1 in the frequency domain, and the RBs on each antenna port have the same numbering in case of multi-antenna port transmission. In one slot, if the RBs with the same index i (0<=i<=NRB−1) on different antenna ports can be identified, all the identified RBs are denoted RBi, where 0<=i<=NRB−1, and this RB supports multiple antenna port transmission. When L RSs corresponding to L antenna ports are transmitted in one RB supporting multiple antenna port transmission, each RS is transmitted in the RB on its corresponding antenna port. Among these RBs supporting multiple antenna port transmission, some are used for transmission of broadcast channels while other is not, i.e. the RBs supporting multiple antenna port transmission can be seen to be divided into two distinct and exclusive sets, wherein a first set comprises all RBs providing a broadcast channel and a second set comprises all other RBs supporting multiple antenna port transmission. The idea is to transmit a first number of RSs, relating to the RSs defined in LTE, in at least one RB or in each RB supporting multiple antenna port transmission; and transmit a second number of RSs, relating to the additional number of RSs defined in LTE-A, in at least one RB which is an element in the second set of RBs as defined above. Hence, the second number of RSs will not be transmitted in a RB in which a broadcast channel is transmitted in.

Furthermore, the P/S-SS defined in LTE should also be reused in a LTE-A system to fulfil the requirement of backward compatibility. In order to preserve synchronization performance, the P/S-SS should not be impacted by other physical signals or channels in a LTE-A system. To avoid the situation that P/S-SS will be punctured by the RSs for additional antenna ports, the RBs containing P/S-SS can be included in the above mentioned first set of RBs, i.e. the second number of RSs will not be transmitted in a RB in which a P-SS or S-SS, and a broadcast channel are transmitted in.

In order to enable LTE UEs to operate properly in a LTE-A system, the control information (e.g. Physical Downlink Control Channel (PDCCH), Physical Control Format Indicator Channel (PCFICH) and Physical Hybrid ARQ Indicator Channel (PHICH)) as defined in the LTE standard also need to be reused, or otherwise LTE-UEs will not be able to detect the control channels. In LTE, the control information is transmitted in the first T OFDM symbols of each SF, where T=1, 2, 3 or 4. The area for transmission of control information is defined as control region, and hence the remaining REs except for PBCH, P/S-SS and RS belong to the PDSCH region. Thus, in a LTE-A system, at least the control information for LTE UEs should have the same transmission structure as in the LTE system. As discussed above, to uphold measurement performance for the eight antenna ports for LTE-A UEs, the CRSs for the additional four antenna ports should not be transmitted in the control region in which LTE UE needs to detect control signalling information. Therefore, the CRSs for the additional four antenna ports could be transmitted in the PDSCH region, except in RBs in which a broadcast channel is transmitted in.

Since, the control region is always located in the first slot of given SFs, it means that each RB in the first slot comprises a control region and a PDSCH region, and each RB in the second slot of given SFs only comprises a PDSCH region. If the RSs for additional four antenna ports are transmitted in the PDSCH region of RBs comprising both a control region and a PDSCH region, LTE-A UE can only measure the channel of antenna ports 4~7 and antenna ports 0~1. The reason is that the RSs for antenna ports 2~3 are only transmitted in the second OFDM symbol of each RB, which are in the control region of RBs including both the control region and the PDSCH region. Therefore, the RBs comprising control regions should be included into the above mentioned first set of RBs. Based on this observation, the second number of RSs should be transmitted in the RBs within the second slot of given SFs, except in the RBs in which a broadcast channel is transmitted in, i.e. the second number of RSs are transmitted in the second slot of given SFs.

Hence, according to different embodiments of the disclosure, RBs used for the additional number of antenna ports (second number of RSs) should not be used by a PBCH or, a synchronization signal such as P-SS or S-SS, or a control channel, such as PDCCH, PDCCH or PHICH, due to the problem of performance degradation of these channels/signals and channel measurement performance. Further, PDSCH regions and control regions of RBs may also be taken into consideration when transmitting the additional number of RSs.

Furthermore, CRSs are used by all UEs in a given cell, and transmitted in reserved resources. In the time domain, the CRSs for additional antenna ports can be transmitted in every one, or every $N_1$ SFs, where $N_1$ is an integer and larger than 1; in the frequency domain, the CRSs for additional antenna ports can be transmitted in every one, or every $N_2$ RB where $N_2$ is an integer and larger than 1. Usually, the CRSs are evenly distributed in the time/frequency resources to achieve the performance balance of channel measurement/estimation. Since the CRSs for additional antenna ports are not transmitted in RBs containing PBCH, it is difficult to distribute the CRSs for the additional antenna ports evenly in SFs containing PBCH. Therefore, in this case the CRSs for additional antenna ports should not transmitted in the SFs with PBCH. According to the above discussion, in a further embodiment of the disclosure, the CRSs for the additional antenna ports should not be transmitted in SFs containing a broadcast channel (e.g. PBCH) or P/S-SS. It should be further noted that if a SF comprises at least one RB supporting multiple antenna port transmission that SF is considered as a SF supporting multiple antenna port transmission.

Some exemplary implementations of different embodiments of the present disclosure will be given in the following, wherein in the following examples it is assumed that there are eight antenna ports in the LTE-A system, and the number of additional antenna ports is therefore four. However, as understood by the skilled person, the present disclosure is not restricted to this number of additional of antenna ports, but the method according to the present disclosure may be employed in wireless communication systems in which a first number of antenna ports and an additional number of RSs are used. Also, in these examples, only the allocated REs for the RSs defining the additional antenna ports within one RB are illustrated.

Exemplary Implementation 1

Figure 11:
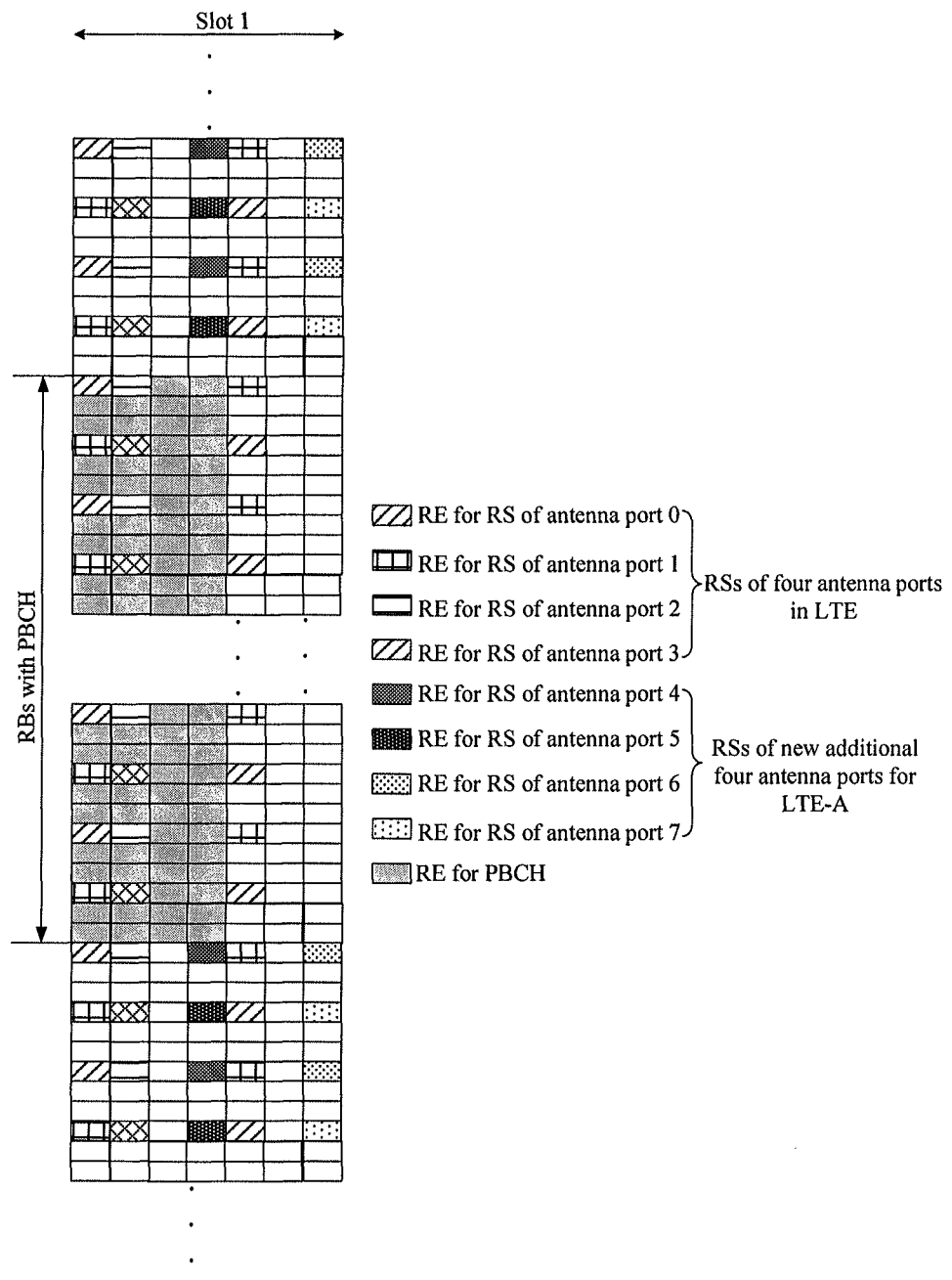
FIG. 11 shows CRSs for additional four antenna ports which are not transmitted in RBs having PBCH.

In this example the CRSs for additional four antenna ports are not transmitted in RBs containing PBCH, and the CRSs are used for channel measurement, or for channel measurement and demodulation. The central six RBs in slot1 (S1) of each radio frame are used for the PBCH, and the CRSs for the additional four antenna ports are not transmitted in the RBs containing the PBCH. This is illustrated in FIG. 11. This figure shows that the antenna ports (0~3) as defined in LTE are transmitted in all RBs supporting multiple antenna port transmission, while the additional number of antenna ports (4~7) are transmitted in RBs in which no broadcast channel, such as PBCH, is transmitted in.

Exemplary Implementation 2

Figure 12:
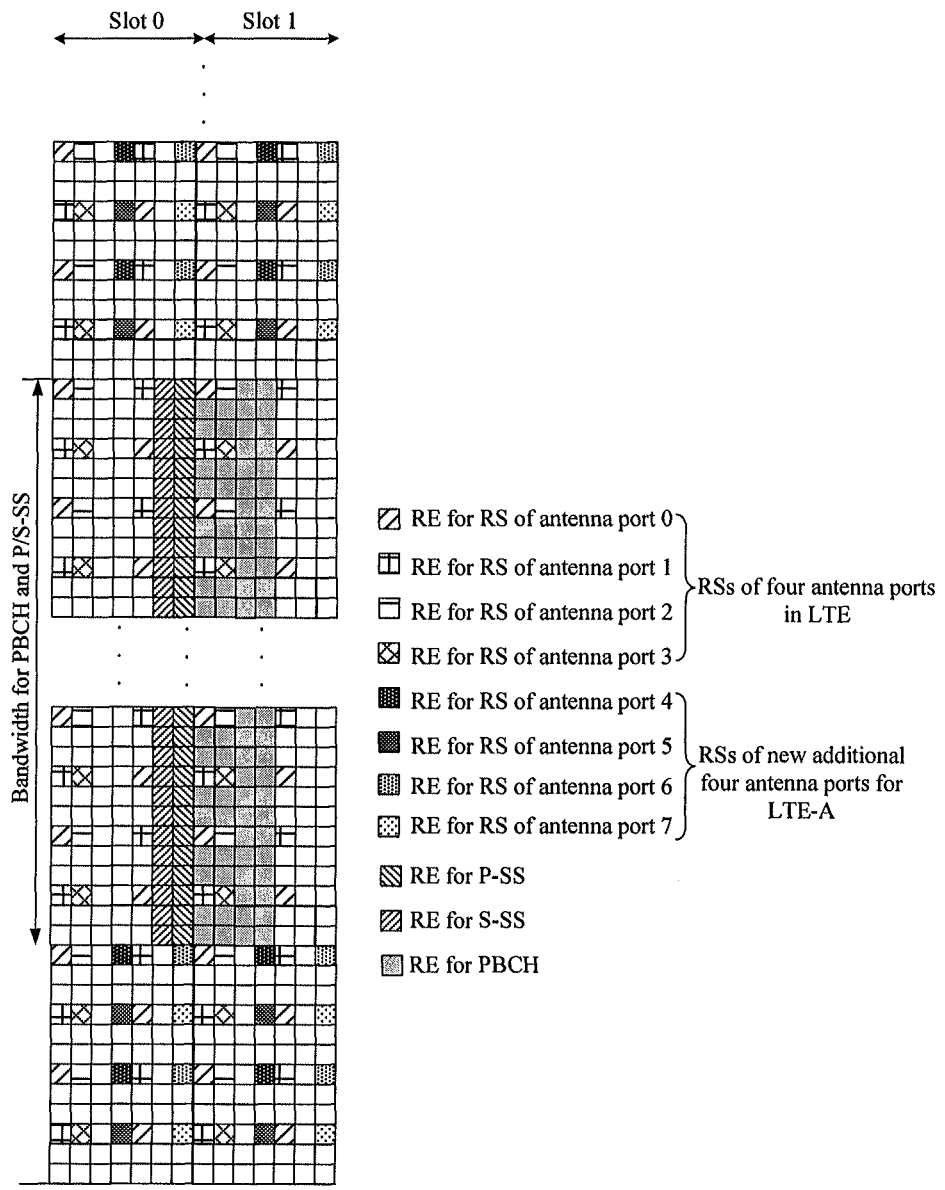
FIG. 12 shows CRSs for additional antenna ports which are not transmitted in RBs having PBCH or P/S-SS.

In order to avoid that the CRSs for the additional four antenna ports puncture the REs allocated for P/S-SS, the CRSs for the additional four antenna ports are not transmitted in the RBs containing PBCH or P/S-SS, which is illustrated in FIG. 12. In this figure, the transmission of the CRSs for the additional four antenna ports in the first SF is shown. The CRSs are not transmitted in a RB containing a broadcast channel (PBCH) or a synchronization channel (P/S-SS) to avoid puncturing of these channels and the CRSs for the first four antenna ports are transmitted in each RB supporting multiple antenna port transmission.

Exemplary Implementation 3

Figure 13:
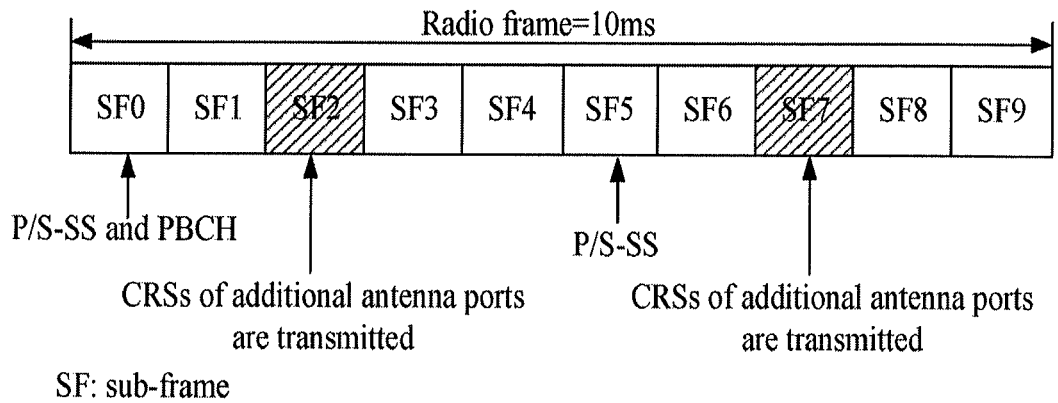
FIG. 13 shows transmission of CRSs for additional antenna ports.
Figure 14:
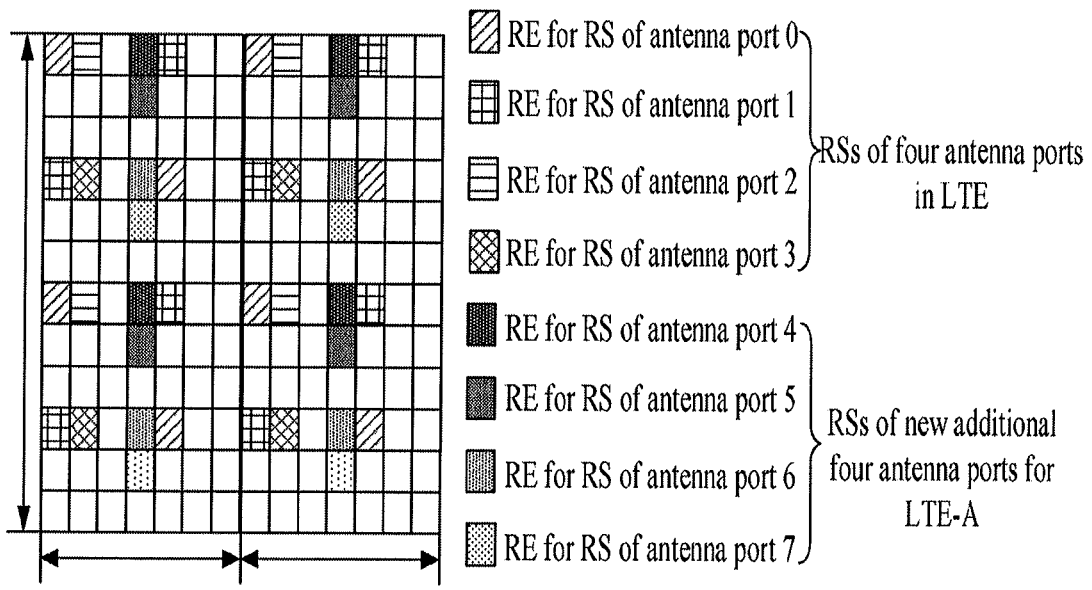
FIG. 14 shows how RSs for eight antenna ports are transmitted on the fourth symbol of even-numbered slots and the sixth symbol of odd-numbered slots.
Figure 15:
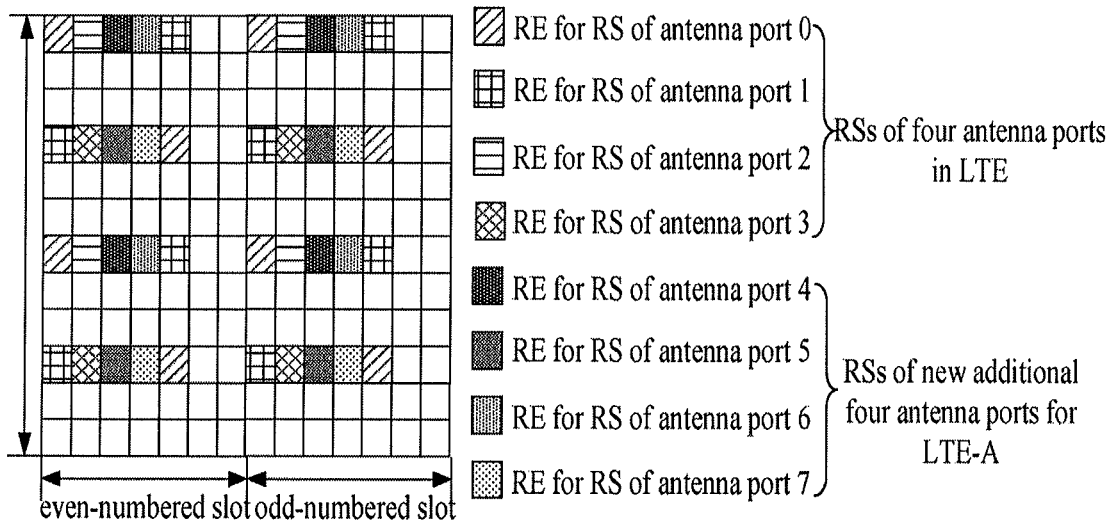
FIG. 15 shows how RSs for eight antenna ports are transmitted on the third and fourth symbol of even-numbered and odd-numbered slots.

The CRSs for the additional four antenna ports are not transmitted in a SF containing PBCH. Instead, they are transmitted in every five SF, in SF2 and SF7, of each radio frame as shown in FIG. 13. In SF2 and SF7, the CRSs may be transmitted in RBs according to the structure as shown in FIG. 14 and FIG. 15, respectively.

Exemplary Implementation 4

Figure 16:
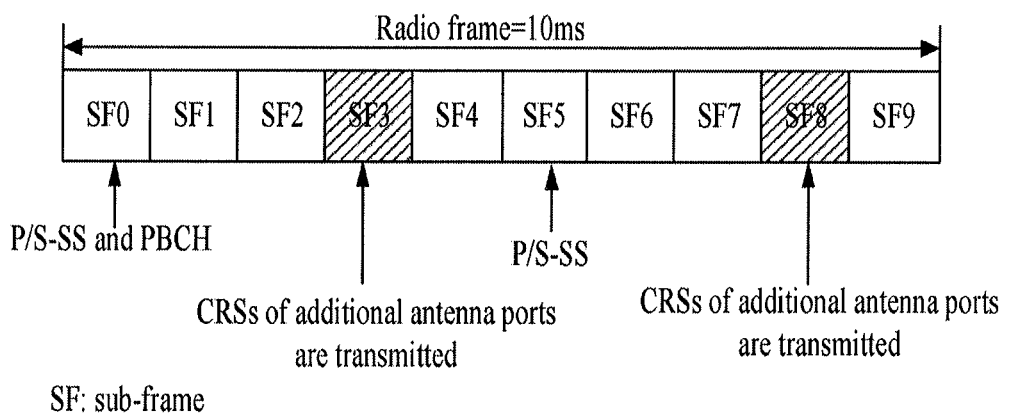
FIG. 16 shows transmission of CRSs for additional four antenna ports.
Figure 17:
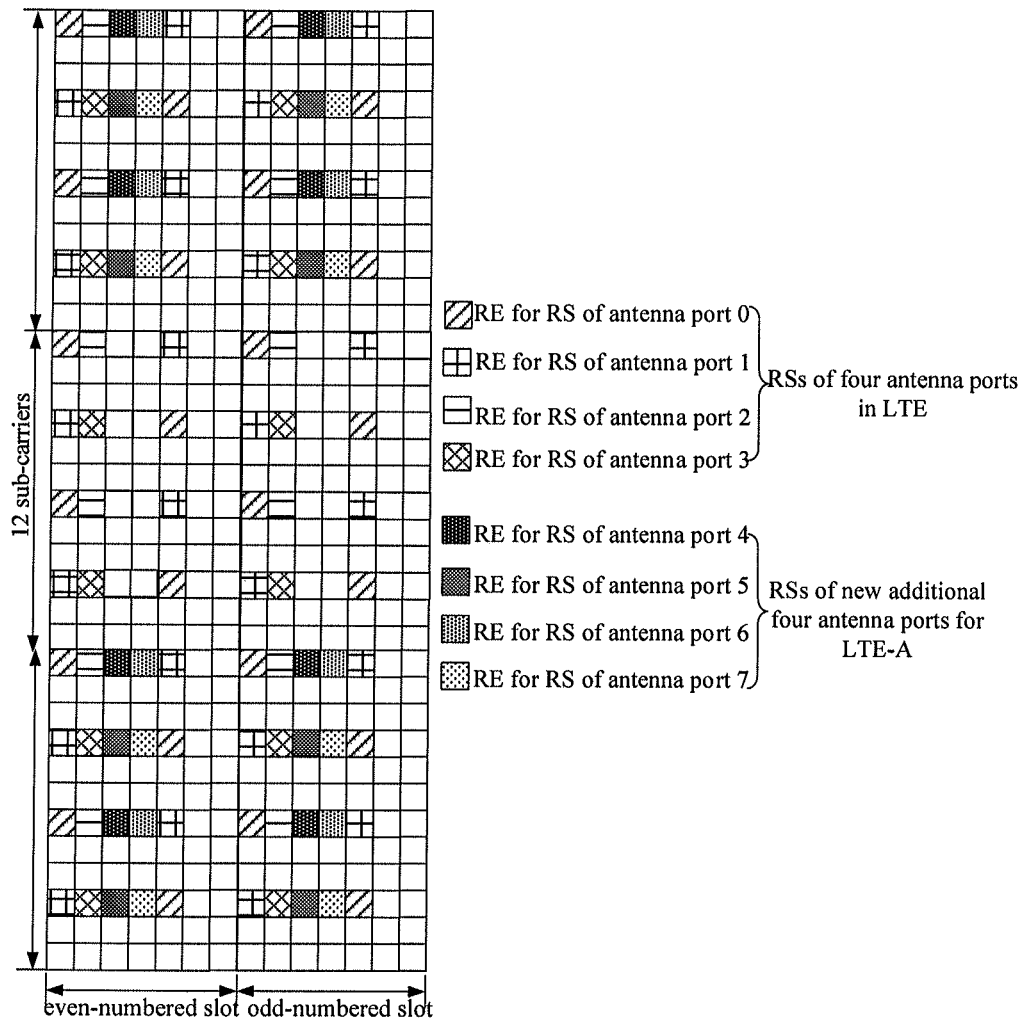
FIG. 17 shows transmission of CRSs for additional antenna ports in one sub-frame.

The CRSs for the additional four antenna ports can be transmitted in every five SF, in SF3 and SF8, respectively, of every radio frame as shown in FIG. 16. In SF3 and SF8, the CRSs for the additional antenna ports are transmitted in every other RB in the frequency domain, and on the third and fourth OFDM symbol of these RBs. This is shown in FIG. 17.

Exemplary Implementation 5

The CRSs for the additional four antenna ports are transmitted in a PDSCH region, except in RBs containing a broadcast channel (PBCH), i.e. they are not transmitted in the control region of each RB, and not in RBs with a broadcast channel (PBCH).

Exemplary Implementation 6

Figure 18:
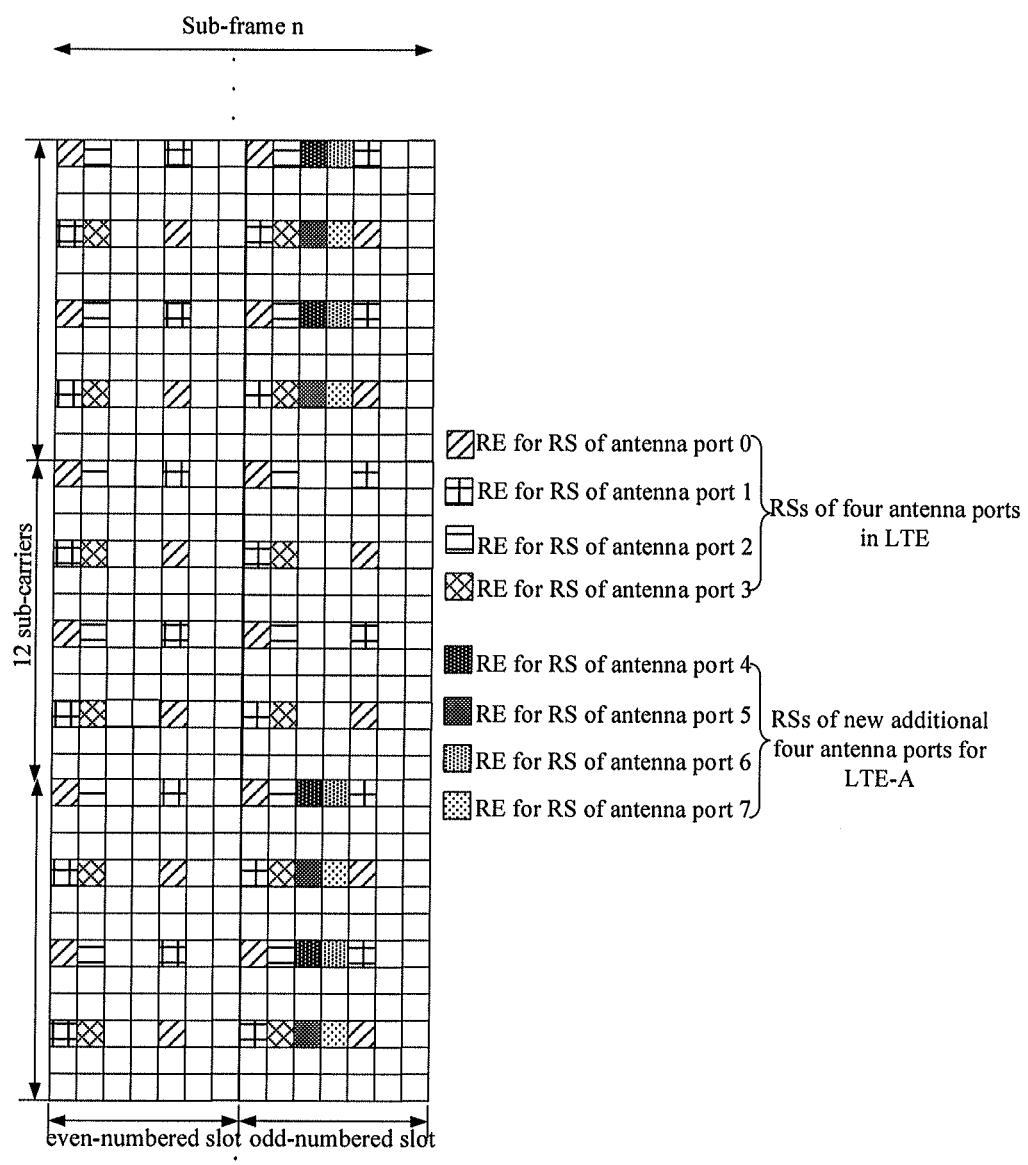
FIG. 18 shows transmission of CRSs for additional four antenna ports in the second slot of a sub-frame.

Since control regions exists in the first slot of each SF, the RSs for antenna ports 0~3 in the control regions cannot be used for measurement by a LTE-A UE. In order to accurately measure the channel for eight antenna ports, the CRSs for the additional four antenna ports are transmitted in RBs belonging to the second slot of given SFs, which comprises CRSs for the additional four antenna ports. If the CRSs for the additional four antenna ports are transmitted in the second slot of the SF comprising PBCH, then the CRSs will not be transmitted in RBs having PBCH. This is illustrated in FIG. 18, and it is shown in this figure that the CRSs for the additional four antenna ports are transmitted in the second slot of the SF, and distributed in every RBs of that slot.

Figure 19:
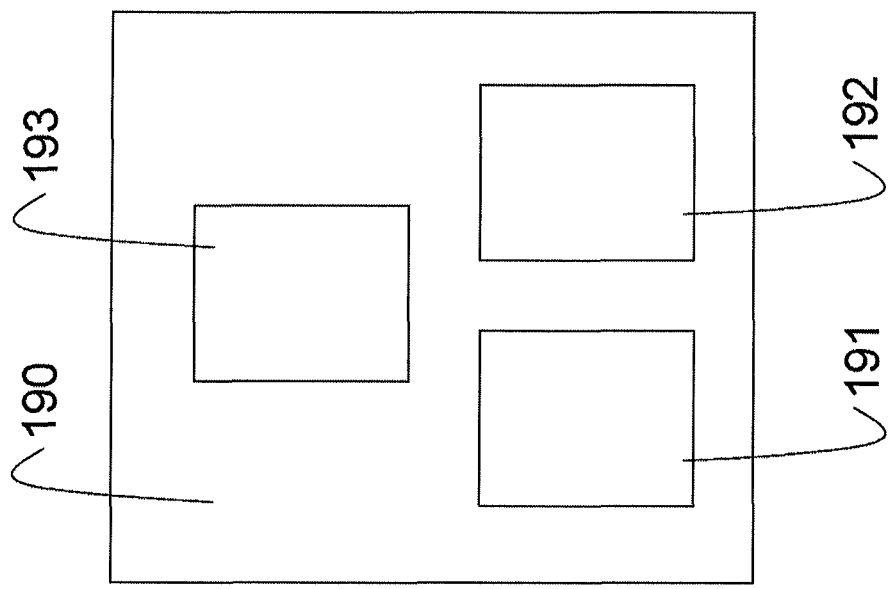
FIG. 19 shows an example transmit node according to the disclosure.

FIG. 19 shows a schematic block diagram of example transmit equipment, such as a base station device or corresponding apparatus, according to the disclosure. The transmit equipment (190) comprises transmit circuitry (191) and processing circuitry (192) providing processing instructions and signals for transmission. The transmit equipment preferably also comprises a storage device (193) for storage of processing instructions and data.

Figure 20:
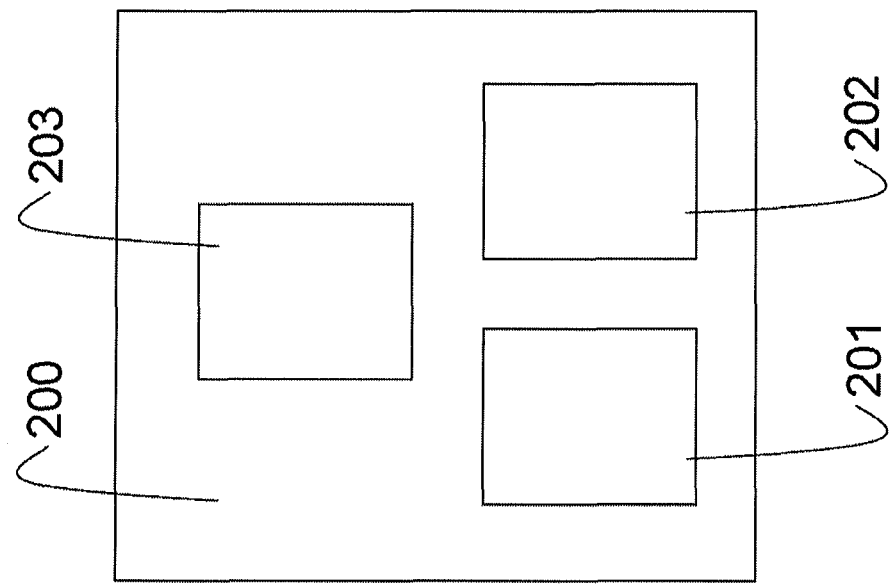
FIG. 20 shows an example receive node according to the disclosure.

FIG. 20 shows a schematic block diagram of example receive equipment, such as user equipment or a mobile terminal, according to the disclosure. The receive equipment (200) comprises receive circuitry (201) and processing circuitry (202) providing processing instructions and controlling received signals. The transmit equipment preferably also comprises a storage device (203) for storage of processing instructions and data.

Also, as understood by the person skilled in the art, the method for transmitting reference signals (RSs) in a wireless communication system according to the present disclosure may be implemented in a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

The invention claimed is:

1. A method of reference signal transmission in resource blocks (RBs) supporting multiple antenna port transmission in a wireless communication system, comprising:
    determining a first and a second mutually exclusive sets of RBs, at least one broadcast channel (BCH) being provided in RBs belonging to said first set of RBs;
    transmitting a number of reference signals (RSes) only in at least one RB belonging to said second set of RBs when a conflict between transmitting said number of RSes and providing said broadcast channel is detected, wherein each RB comprises at least one resource elements (REs);
    wherein the conflict between transmitting said number of RSes and providing said broadcast channel comprises: REs to be used for transmitting said number of RSes and REs used for providing said broadcast channel overlap;
    wherein said RBs supporting multiple antenna port transmission are transmitted in subframes (SFs) supporting multiple antenna port transmission; and
    wherein said number of RSes are transmitted only in a subset of subframes which do not comprise the RBs belonging to said first set of RBs, wherein said number of RSes are transmitted in a same slot of said subset of subframes, and wherein said number of RSes are transmitted in every Mth RB in said same slot, where M is an integer that is greater than or equal to one.

2. The method according to claim 1, wherein said SFs supporting multiple antenna port transmission are divided into a first and a second exclusive sets of SFs and said first set of RBs belongs to said first set of SFs, and wherein
    said number of RSs are transmitted only in at least one SF belonging to said second set of SFs.

3. The method according to claim 2, wherein said number of RSes are transmitted in every Nth SF, where N is an integer and N>1.

4. The method according to claim 2, wherein said number of RSes are transmitted in the second slot of said at least one SF belonging to said second set of SFs.

5. The method according to claim 1, wherein an RB belonging to said second set of RBs comprises one of:
- a physical downlink shared channel (PDSCH) region; and
- a PDSCH region and
    - a control region for at least a physical downlink control channel (PDCCH),
    - a physical control format indicator channel (PCFICH) or a physical hybrid ARQ indicator channel (PHICH);
- wherein said a number of reference signals RSes are transmitted in the PDSCH region in at least one RBs belonging to said second set of RBs.

6. The method according to claim 1, wherein said at least one BCH is physical broadcast channel (PBCH).

7. The method according to claim 1, wherein said wireless communication system is an LTE-A system and said RSes are orthogonal to each other and provided in downlink (DL) transmission.

8. An apparatus of reference signal transmission in resource blocks (RBs) supporting multiple antenna port transmission in a wireless communication system, the apparatus comprising:
- a processor configured to determine a first and a second mutually exclusive sets of RBs, and to provide at least one broadcast channel (BCH) in RBs belonging to said first set of RBs; and
- a transmitter configured to transmit a number of reference signals (RSes) only in at least one RB belonging to said second set of RBs when there is a conflict between transmitting said number of RSes and providing said broadcast channel is detected,
- wherein each RB comprises at least one resource elements (REs);
- wherein the conflict between transmitting said number of RSes and providing said broadcast channel comprises: REs to be used for transmitting said number of RSes and REs used for providing said broadcast channel overlap;
- wherein said RBs supporting multiple antenna port transmission are transmitted in subframes (SFs) supporting multiple antenna port transmission; and
- wherein said number of RSes are transmitted only in a subset of subframes which do not comprise the RBs belonging to said first set of RBs, wherein said number of RSes are transmitted in a same slot of said subset of subframes, and wherein said number of RSes are transmitted in every Mth RB in said same slot, where M is an integer that is greater than or equal to one.

9. The apparatus according to claim 8, wherein said at least one BCH is a physical broadcast channel (PBCH).

10. The apparatus according to claim 8, wherein said wireless communication system is an LTE-A system and said RSes are orthogonal to each other and provided in downlink (DL) transmission.

11. A method of reference signal transmission in resource blocks (RBs) supporting multiple antenna port transmission in a wireless communication system, comprising:
- determining a first and a second mutually exclusive sets of RBs, at least one synchronization signal (SS) being provided in RBs belonging to said first set of RBs; and
- transmitting a number of reference signals (RSes) only in at least one RB belonging to said second set of RBs when a conflict between transmitting said number of RSes and providing said SS is detected, wherein said at least one SS is a primary synchronization signal (P-SS), or a secondary synchronization signal (S-SS),
- wherein each RB comprises at least one resource elements (REs);
- wherein the conflict between transmitting said number of RSes and providing said broadcast channel comprises: REs to be used for transmitting said number of RSes and REs used for providing said SS overlap;
- wherein said RBs supporting multiple antenna port transmission are transmitted in subframes (SFs) supporting multiple antenna port transmission; and
- wherein said number of RSes are transmitted only in a subset of subframes which do not comprise the RBs belonging to said first set of RBs, wherein said number of RSes are transmitted in a same slot of said subset of subframes, and wherein said number of RSes are transmitted in every Mth RB in said same slot, where M is an integer that is greater than or equal to one.

12. The method according to claim 11, wherein said SFs supporting multiple antenna port transmission are divided into a first and a second exclusive sets of SFs and said first set of RBs belongs to said first set of SFs, and wherein
- said number of RSs are transmitted only in at least one SF belonging to said second set of SFs.

13. The method according to claim 12, wherein said number of RSes are transmitted in every Nth SF, where N is an integer and N>1.

14. The method according to claim 12, wherein said number of RSes are transmitted in the second slot of said at least one SF belonging to said second set of SFs.

15. The method according to claim 11, wherein an RB belonging to said second set of RBs comprises one of:
- a physical downlink shared channel (PDSCH) region; and
- a PDSCH region and
    - a control region for at least a physical downlink control channel (PDCCH),
    - a physical control format indicator channel (PCFICH) or a physical hybrid ARQ indicator channel (PHICH);
- wherein said a number of reference signals RSes are transmitted in the PDSCH region in at least one RBs belonging to said second set of RBs.

16. The method according to claim 11, wherein said at least one BCH is physical broadcast channel (PBCH).

17. The method according to claim 11, wherein said wireless communication system is an LTE-A system and said RSes are orthogonal to each other and provided in downlink (DL) transmission.

18. An apparatus of reference signal transmission in resource blocks (RBs) supporting multiple antenna port transmission in a wireless communication system, the apparatus comprising:
- a processor configured to determine a first and a second mutually exclusive sets of RBs, and to provide at least one synchronization signal (SS) in RBs belonging to said first set of RBs; and
- a transmitter configured to transmit a number of reference signals (RSes) only in at least one RB belonging to said second set of RBs when a conflict between transmitting said number of RSes and providing said SS is detected, wherein said at least one SS is a primary synchronization signal (P-SS), or a secondary synchronization signal (S-SS),
- wherein each RB comprises at least one resource elements (REs);
- wherein the conflict between transmitting said number of RSes and providing said broadcast channel comprises: REs to be used for transmitting said number of RSes and REs used for providing said SS overlap;
- wherein said RBs supporting multiple antenna port transmission are transmitted in subframes (SFs) supporting multiple antenna port transmission; and wherein said number of RSes are transmitted only in a subset of subframes which do not comprise the RBs belonging to said first set of RBs, wherein said number of RSes are transmitted in a same slot of said subset of subframes, and wherein said number of RSes are transmitted in every Mth RB in said same slot, where M is an integer that is greater than or equal to one.

19. The apparatus according to claim 18, wherein said at least one BCH is a physical broadcast channel (PBCH).

20. The apparatus according to claim 18, wherein said wireless communication system is an LTE-A system and said RSes are orthogonal to each other and provided in downlink (DL) transmission.

* * * * *